United States Patent [19]

Brewer et al.

[11] Patent Number: 5,963,207
[45] Date of Patent: Oct. 5, 1999

[54] SYSTEMS, METHODS, AND COMPUTER PROGRAM PRODUCTS FOR PRESENTING LISTS OF USER-SELECTABLE INFORMATION

[75] Inventors: Janet A. Brewer, Pittsboro; Kathryn H. Britton, Chapel Hill; D. Kirk Grotjohn; David Sanders, both of Raleigh, all of N.C.

[73] Assignee: International Business Machines Corporation, Armonk, N.Y.

[21] Appl. No.: 08/911,859

[22] Filed: Aug. 15, 1997

[51] Int. Cl.[6] .................................................. G06F 3/14
[52] U.S. Cl. ................................................ 345/352; 707/7
[58] Field of Search .................................... 345/326, 339, 345/340, 350, 352, 353, 354, 333, 334, 965, 966, 969, 146, 902, 970; 364/188; 707/7

[56] References Cited

U.S. PATENT DOCUMENTS

| | | | |
|---|---|---|---|
| 5,396,264 | 3/1995 | Falcone et al. | 345/352 X |
| 5,420,975 | 5/1995 | Blades et al. | 345/334 |
| 5,465,358 | 11/1995 | Blades et al. | 345/339 |
| 5,625,783 | 4/1997 | Ezekial et al. | 345/352 |
| 5,666,502 | 9/1997 | Capps | 345/352 |
| 5,687,334 | 11/1997 | Davis et al. | 345/339 |
| 5,781,193 | 7/1998 | Alimpich et al. | 345/352 |
| 5,821,936 | 10/1998 | Shaffer et al. | 345/352 |
| 5,825,361 | 10/1998 | Rubin et al. | 345/966 X |

*Primary Examiner*—Matthew M. Kim
*Assistant Examiner*—Crescelle N. dela Torre
*Attorney, Agent, or Firm*—Myers Bigel Sibley & Sajovec, P.A.; Jeanine S. Ray-Yarletts

[57] ABSTRACT

Systems, methods, and computer program products for displaying user selectable attributes for a first item contained within a set of items are provided. Attributes previously configured for the first item are displayed in a user interface so as to indicate their status as previously configured for the first item. Attributes previously configured for other items contained within the set are displayed in the user interface so as to indicate their status as previously configured for the other items. Attributes not configured for any item contained within the set may be displayed in the user interface so as to indicate their status as not configured for any item within the set.

39 Claims, 5 Drawing Sheets

SYSTEMS, METHODS, AND COMPUTER PROGRAM PRODUCTS FOR PRESENTING LISTS OF USER-SELECTABLE INFORMATION

FIELD OF THE INVENTION

The present invention relates generally to computer systems and more particularly to user interfaces for computer systems.

BACKGROUND OF THE INVENTION

Many computer applications involve selecting elements from one or more lists for the purpose of assigning values to, or performing some tasks on, the selected elements. An exemplary application involving the selection of elements from a list is a Dynamic Host Configuration Protocol (DHCP) Server configuration program. A DHCP server configuration program provides various configuration information to clients in client-server communication networks, such as Internet Protocol (IP) addresses, policy filters for non-local source routing, default IP time-to-live values, and the like. Specifically, there are hundreds of different options that can be configured in a DHCP server for serving to clients.

Applications which require users to select elements from a list, such as the DHCP server, typically present the user with some sort of scrollable pick list. Unfortunately, requiring users to scroll through large lists in order to select elements to use, or to see which elements are currently in use, may be inefficient and confusing and may lead to user mistakes. Furthermore, it is often helpful for a user to know which elements he or she should select for a particular application, or which elements are currently being used for a particular application. Some application user interfaces do provide the user with some historical information about elements previously selected from a list. Web browsers, such as Netscape Navigator®, store the addresses of web sites visited by a user during a particular session. The user, during the same session, can review, select and revisit web sites contained in the list. Word processing programs, such as Microsoft Word®, typically provide a list of fonts available for use within a document. The word processing program may also display the font most recently used by a user. However, the existing methods of presenting historical data to a user do not provide ways of relieving the user from scrolling down through sometimes voluminous lists of elements.

SUMMARY OF THE INVENTION

In view of the above discussion, it is an object of the present invention to provide a user interface that reduces search time, user confusion and mistakes when a user is required to select various information from lengthy and/or detailed lists of information.

It is another object of the present invention to provide a user interface that presents information to users according to past user behavior.

It is a further object of the present invention to provide a user interface that presents information to users based upon the task currently being performed by a user.

These and other objects of the present invention are provided by methods, systems and computer program products for displaying, in a user interface displayed on a display device, user selectable attributes for a currently selected or first item contained within a set of items. Operations include displaying attributes previously configured for the first item so as to indicate their status as previously configured for the first item, and displaying attributes previously configured for other items contained within the set so as to indicate their status as previously configured for the other items. Additional operations include displaying attributes not configured for any item contained within the set so as to indicate their status as not configured for any item within the set.

According to one aspect of the invention, attributes previously configured for the first item are displayed in a first area of the user interface, and the attributes previously configured for the other items contained within the set are displayed in a second area of the user interface adjacent the first area. Attributes not configured for any item contained within the set are displayed in a third area of the user interface adjacent the second area. Each of the plurality of user selectable attributes may have a value configurable by a user or may be selected by a user.

According to another aspect of the invention, user selectable attributes for a first item within a set of items are displayed in a user interface on a display device such that attributes previously configured for the first item indicate their status as previously configured for the first item. Additionally, attributes not previously configured or selected for the first item indicate their status as not previously configured for the first item. The attributes previously configured for the first item are displayed in a first area of the user interface, and the attributes not previously configured for the first item are displayed in a second area of the user interface adjacent the first area. Each of the plurality of user selectable attributes have values configurable by a user.

According to a further aspect of the invention, attributes are configured for a first item contained within a set. Attributes previously configured for the first item are displayed in a user interface displayed on a display device so as to indicate their status as previously configured for the first item. Attributes previously configured for other items contained within the set are displayed in the user interface displayed on the display device so as to indicate their status as previously configured for the other items.

In addition, attributes not previously configured for any item contained within the set are displayed in the user interface displayed on the display device so as to indicate their status as not previously configured for any item contained within the set. The attributes previously configured for the first item are displayed in a first area of the user interface, and the attributes previously configured for other items contained within the set are displayed in a second area of the user interface adjacent the first area. The attributes not configured for any item contained within the set are displayed in a third area of the user interface adjacent the second area. A user can select attributes for the first item from the attributes displayed in the first, second, or third areas of the user interface.

The present invention facilitates simplifying the task of defining and redefining attributes for items within a set by presenting the attributes to the user in various ways. For example, when a first item is created and added to the set, the user chooses which attributes are to be defined for this item from the entire list of possible attributes. When the user creates a second item and adds it to the set, the attributes defined for the first item are grouped together and displayed to the user in a specific area of the user interface. By grouping these attributes together, the user does not have to search through the entire list of attributes again. When a user desires to view the attributes for an item already created and contained within the set, an additional grouping of attributes defined for the type of item selected, such as a client machine or router, may be presented to the user.

The present invention is advantageous because it tailors the presentation of information to a user based on the information that the user most likely wants to see. In particular, the present invention is advantageous when a set of items exists and there are many possible properties or attributes that need to be configured for each item. Often, only a small subset of all possible attributes for any given item within the set are necessary to be defined by a user, and this set is likely to be the same for many items. The present invention also facilitates user consistency when selecting or configuring attributes for multiple items by reminding the user of the attributes selected or configured for other items.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will further be appreciated by those of skill in the art, the present invention may be embodied as a method, apparatus/system or computer program product. Accordingly, the present invention may take the form of an entirely hardware embodiment, an entirely software embodiment or an embodiment combining software and hardware aspects.

Figure 1:
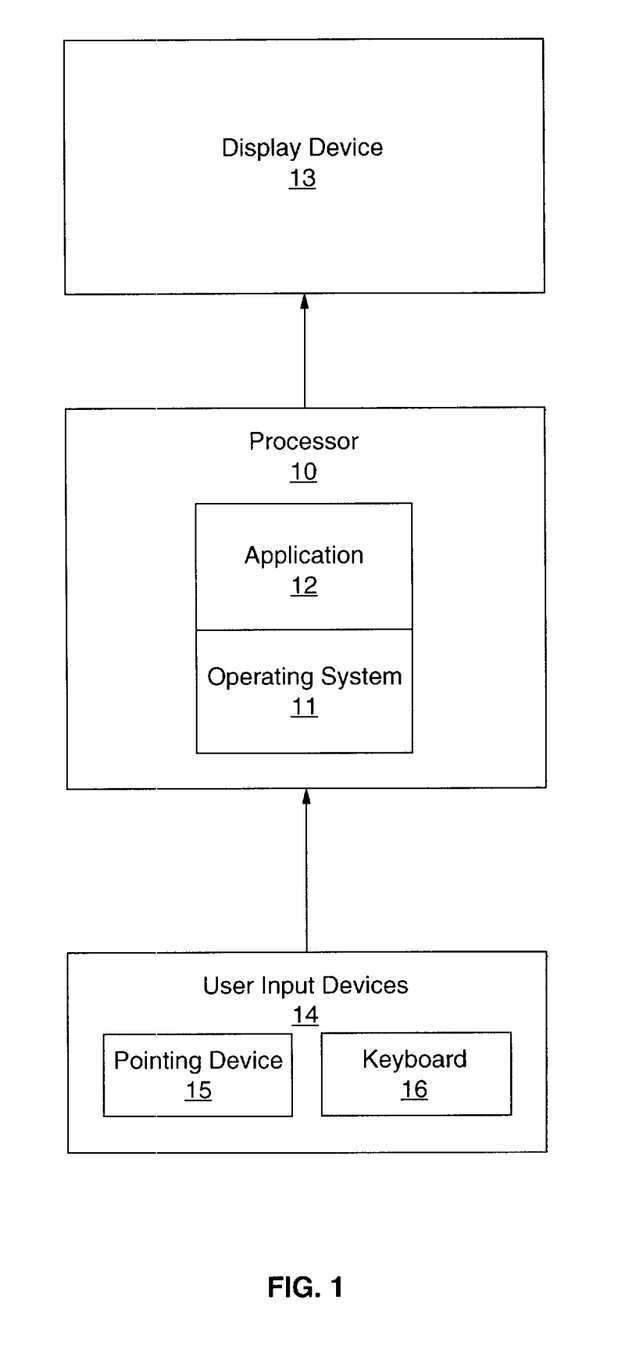
FIG. 1 illustrates an exemplary data processing system in which the present invention may be implemented.

Referring now to FIG. 1, an exemplary data processing system in which the present invention may be implemented is illustrated. As seen in FIG. 1, a data processor 10 may have an operating system 11 resident therein. An application program 12 typically executes via the operating system 11. The processor 10 displays information on a display device 13 which has a plurality of picture elements (collectively referred to as a screen). Typically, the information is displayed on the display device 13 within a user interface environment. The contents of the screen of the display device 13 and, therefore, the appearance of the user interface environment, may be controlled or altered by the application program 12 or the operating system 11 either individually or in combination. For obtaining input from a user, the operating system 11, the application program 12, or both, may utilize user input devices 14. User input devices 14 may include a pointing device 15, such as a mouse, and a keyboard 16 or other input devices known to those of skill in the art. User input devices 14 may be used to designate areas of the screen or locations on the screen such as the border of a workspace or the corner of the borders of the workspace.

As used herein, the term "item" refers to an entity being configured by having one or more attributes associated with it. The term "element" refers to an element of a list of possible attributes that may be associated with an item. The term "attribute" refers to a property, behavior, or feature of an item.

Figure 2:
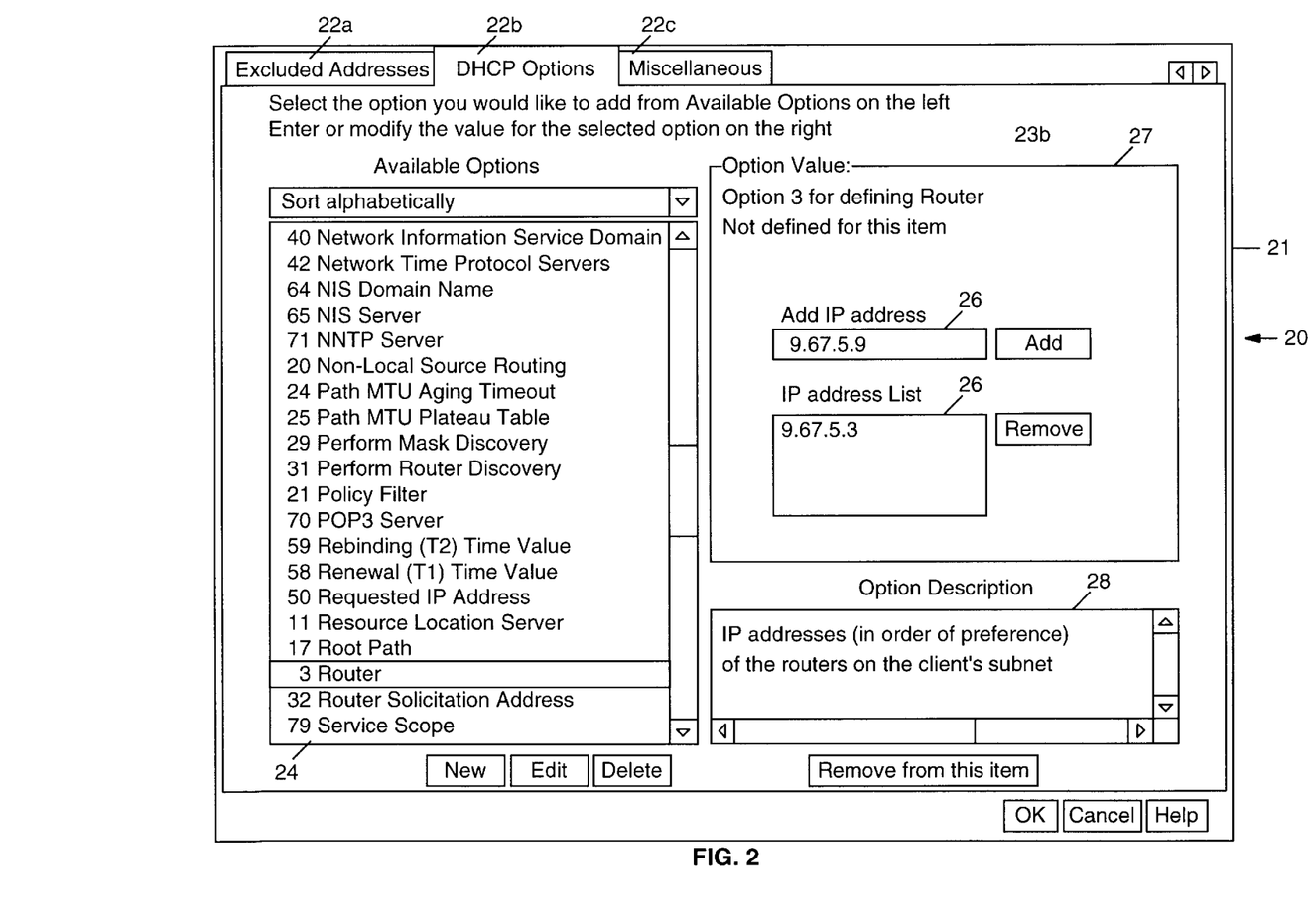
FIG. 2 illustrates a user interface for a DHCP server configuration program from which a user selects various options and assigns values thereto.

An exemplary DHCP option configuration user interface 20 is illustrated in FIG. 2. The illustrated user interface includes a window 21 for displaying in a notebook format the information about a selected item, such as a client machine or a subnetwork containing a group of client machines. A series of tabs 22a, 22b, 22c identify respective pages which can be displayed via the window 21. In the illustrated embodiment, the "DHCP Options" page 23b is displayed in the window 21. The DHCP Options page 23b includes a scrollable text box 24 for displaying all possible DHCP server options for a selected item, allowing the user to select some options in order to configure their values. Values for the options displayed in the text box can be added, modified, or deleted via the data entry fields 26 displayed within the "Option Value" box 27 adjacent the scrollable text box 24. In the illustrated embodiment, a description of each option is provided in an "Option Description" box 28 positioned adjacent to the scrollable text box 24 and the "Option Value Box" 27.

The number of configuration options presented to a user in the illustrated scrollable text box 24 may be voluminous and somewhat complex. Users must scroll down through the list of options to locate each particular option to be configured. No provision is made in the user interface for displaying to the user what particular options should be selected and configured for a particular item, such as other client machines in a subnetwork or in an identified class and the like. For a particular item for which the user wishes to select options from the list, no information is provided as to what options have been previously selected for the item or what options are currently defined for the item.

Figure 3:
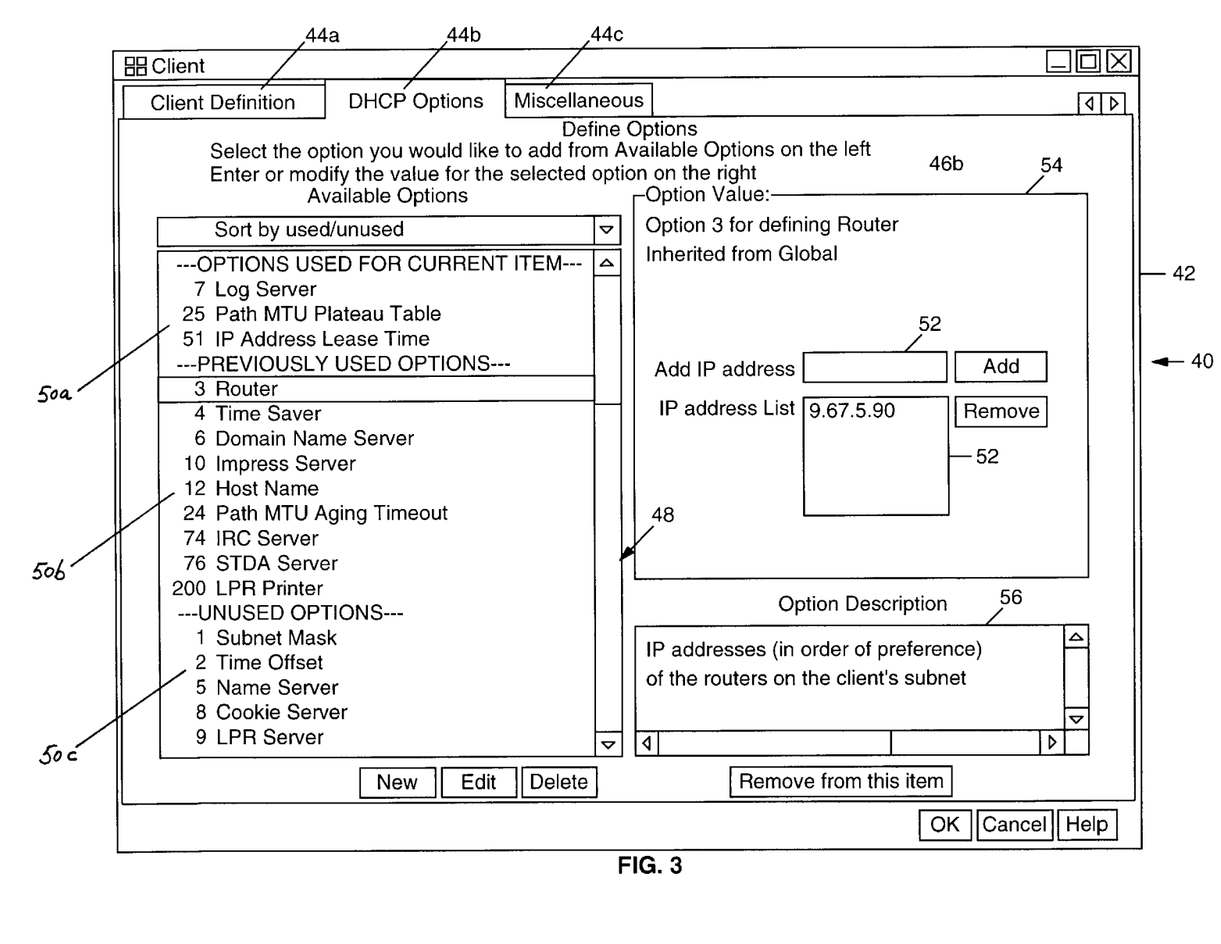
FIG. 3 illustrates the DHCP server configuration program user interface of FIG. 2 modified to include various aspects of the present invention.

Referring now to FIG. 3, a DHCP server incorporating aspects of the present invention is illustrated. The illustrated user interface includes a window 42 for displaying information in notebook format. A series of tabs 44a, 44b, 44c identify respective pages which can be displayed via the window 42. In the illustrated embodiment, the "DHCP Options" page 46b is displayed in the window 42.

The DHCP Options page 46b includes a scrollable text box 48 for displaying and allowing users to select and configure values of all DHCP server options for each item, such as other client machines in a subnetwork or in an identified class and the like. The options for each item within the set are displayed in first, second and third areas 50a, 50b, 50c as shown. Values for the options displayed in the text box can be added, modified, or deleted via data entry fields 52 displayed within the "Option Value" box 54 adjacent the scrollable text box 48. In the illustrated embodiment, IP address values can be added, modified, or deleted in the displayed data entry fields 52. Also in the illustrated embodiment, a description of each option is provided in an "Option Description" box 56 positioned adjacent to the scrollable text box 48 and the option value box 54.

As illustrated, the options displayed in the first, second and third areas 50a, 50b, 50c are organized into the respective categories of: "Options Used For Current Item"; "Previously Used Options"; and "Unused Options." "Options Used For Current Item" includes options or attributes that have been configured previously for the selected item, which, in the illustrated case, is a client. "Previously Used Options" includes options or attributes that have been configured for any other item (client) in the set, but are not currently configured for the current item. "Unused Options" includes options or attributes that have not been selected for any item (client) in the set. The options are sorted and displayed in this manner because the user will most likely want to configure the same options for similar items within the set. In particular, when a user wishes to re-configure the options for a particular item, such as "Client A", he/she will most likely wish to reconfigure those options previously configured for Client A, or configured for other similar items, such as Client B. Rather than having to scroll down through a voluminous list of options, the present invention displays to the user in the "Options Used For Current Item" area 50a the options previously configured for the selected item, and in the "Previously Used Options" area 50b the options previously configured for other similar items.

By displaying the "Options Used For Current Item" area 50a and the "Previously Used Options" area 50b at the top of the scrollable list of options displayed in the scrollable text box 48, users are presented with a "snapshot" of previous user actions. An otherwise complex user interface for configuring a plurality of options for items within a set is rendered more usable by the present invention by allowing users to view and select options that are most likely to be needed.

Attributes and options may be displayed in accordance with aspects of the present invention in various ways. The present invention is not limited to display formats illustrated in FIG. 3. Additional display formats may include distinguishing used from unused elements of a list by coloring them differently. Other methods, known to those skilled in the art, may be used to control whether or not certain attributes and options are selectable by a user. In addition, the areas 50a, 50b, and 50c illustrated in FIG. 3, may be displayed via respective windows or via respective boxes within a window of a user interface. The areas 50a, 50b, and 50c illustrated in FIG. 3, may be arranged in various relationships, including adjacent relationships within a user interface.

Figure 4A:
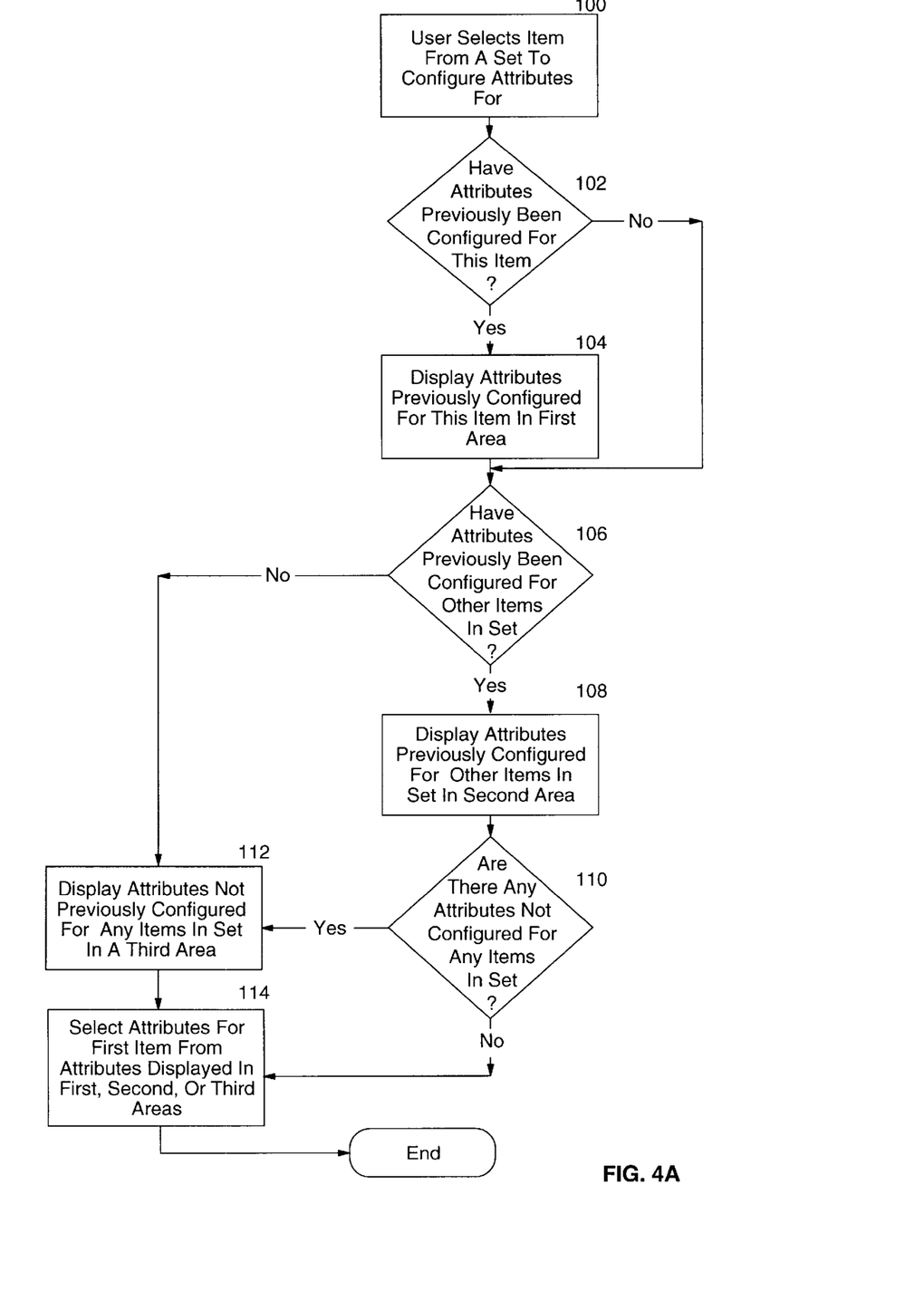
FIGS. 4A–4B are flowcharts schematically illustrating operations for various aspects of the present invention.
Figure 4B:
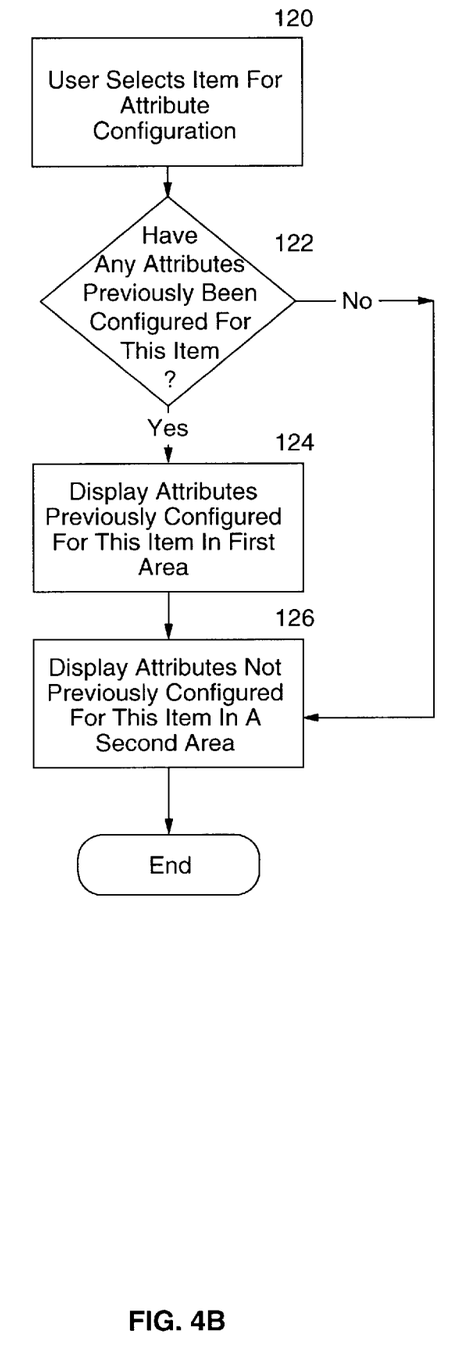

Operations for various aspects of the present invention are schematically illustrated in FIGS. 4A and 4B. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

The computer program instructions may also be executed by a processor or other programmable data processing apparatus to cause a series of operational steps to be performed by the processor or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Referring now to FIG. 4A, operations for displaying user selectable attributes for a first item contained within a set of items are illustrated. A user selects an item from the set for the purpose of configuring attributes for the item (Block 100). For the DHCP server example, an exemplary item would be a client machine. A determination is made whether attributes have been previously configured for the selected item (Block 102). If the answer is yes, the attributes previously configured for the selected item are displayed within a first area of a user interface screen (Block 104).

If attributes have not been configured previously for the selected item, a determination is made whether attributes have been configured previously for other items in the set (Block 106). For the DHCP server example, exemplary other items might include other client machines in a subnetwork or in an identified class and the like. If the answer is yes, the attributes previously configured for other items in the set are displayed within a second area of the user interface screen (Block 108). A determination is made whether there are any attributes not configured for any items in the set (Block 110). If attributes have not been configured for any items in the set, then these attributes which have not been configured are displayed in a third area within the user interface (Block 112). The user may then select the attributes displayed in the first, second, or third areas (Block 114) and use these attributes to configure the selected item. If there are not any attributes configured for any items in the set, the user may select any displayed attributes (Block 114).

The first, second, and third areas may be adjacent to each other. The first, second, and third areas may be arranged within the user interface such that the first area is above the second area and such that the second area is above the third area as illustrated in FIG. 3.

Referring now to FIG. 4B, operations for displaying user selectable attributes for a first item within a set of items, are schematically illustrated. A user selects an item, such as a client, from the set for the purpose of configuring attributes for the item (Block 120). A determination is made whether attributes have been previously configured for the selected item (Block 122). If the answer is yes, the attributes previously configured for the selected item are displayed within a first area of a user interface screen (Block 124). Attributes which have not been configured previously for the selected item, they are displayed in a second area within the user interface (Block 126). Preferably, the first and second areas are adjacent to each other. Even more preferably, the first and second areas are arranged within the user interface such that the first area is above the second area.

The present invention is not limited to the configuration of options for DHCP servers. The present invention may be utilized to simplify any type of complex information presented to users within a user interface. For example, with a multi-page notebook display format, such as that illustrated in FIG. 3, the present invention can be utilized to present the various pages to the user in a particular sequence. For example, a particular page may be displayed on top with the remaining pages arranged below in a preferred sequence.

Other aspects of the present invention are illustrated in the examples below:

EXAMPLE 1

A user wants to create and fill out multiple forms, one form for each of a group of customers. The user can select from a list of possible fields to be inserted within each form. Each form will have multiple fields to be filled in with information about the particular customer. Only some fields are relevant for each form. When the user creates the form for the first customer, the user selects several of the fields, such as name, address, customer number, and the like. When the user creates the next form, a list of fields used in the previously created form are displayed together for the user. The user can select these fields easily for the second form without having to search through the entire list of possible fields. This makes it easier for a user to tailor a form to match the needs of a particular group of people.

When the user wishes to modify or view an existing form at a later time, a first grouping of fields defined for the particular selected form will be displayed in a first area of a user interface. A second grouping of fields defined for other forms, but not for the selected form, within the set of created forms will be displayed in a second area of a user interface. This second grouping of fields allows the user to easily determine if he/she forgot to define a commonly used field for the particular selected form. A third grouping of fields may include all fields that have not been defined for any forms within the set of forms.

EXAMPLE 2

A computer network system administrator tool is provided which allows administrators to customize application programs for computer network users. Although there are many different variables that can be customized, there is a small subset of these variables that is desired to be customized for each computer network user, such as the default install directory, templates to be installed, default printer, program components to be installed, server names, and the like. Although, the values for each customized variable may be different for each user, it is desirable to customize the same set of variables for each user.

For the first user, the variables to be customized are selected and appropriate values are assigned thereto. For the remaining users, the variables used for the previous users are grouped separately for display, thereby making it easier to provide values for only those variables to be customized. When later viewing the variables defined for an existing user, the variables actually defined for a selected user are grouped together for display adjacent to the grouping of variables of all other users within the set.

EXAMPLE 3

The present invention may be utilized to facilitate the presentation of fonts within a word processing program. A user may be presented with:

1) A list of fonts being utilized within the document being edited;

2) A list of fonts used in a set of documents. The set of documents could be defined as all documents previously opened in this word processing program (on this workstation) or all documents in a project (or workgroup); and 3) A list of fonts supported by the word processing program but not currently used within the current document or within the set of documents in #2.

This implementation of the present invention is advantageous because a user can quickly and accurately select fonts currently used within the document being edited, or within other documents within a set. Accordingly, font consistency and homogeneity can be maintained for one or many documents.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of displaying, in a user interface displayed on a display device, user selectable attributes for a first item contained within a set of items, the method comprising the steps of:

displaying attributes previously configured for the first item in a first list so as to indicate their status as previously configured for the first item; and displaying attributes previously configured for other items contained within the set in a second list so as to indicate their status as previously configured for the other items.

2. A method according to claim 1 further comprising the step of displaying attributes not configured for any item contained within the set in a third list so as to indicate their status as not configured for any item within the set.

3. A method according to claim 1 wherein the attributes previously configured for the first item are displayed in a first list within a first area of the user interface, and the attributes previously configured for the other items contained within the set are displayed in a second list within a second area of the user interface adjacent the first area.

4. A method according to claim 2 wherein the attributes not configured for any item contained within the set are displayed in a third list within a third area of the user interface adjacent the second area.

5. A method according to claim 1 wherein each of the plurality of user selectable attributes have values configurable by a user.

6. A method of displaying, in a user interface on a display device, user selectable attributes for a first item within a set of items, the method comprising the steps of:

displaying attributes previously configured for the first item in a first list so as to indicate their status as previously configured for the first item; and displaying attributes not previously configured for the first item in a second list so as to indicate their status as not previously configured for the first item.

7. A method according to claim 6 wherein the attributes previously configured for the first item are displayed in a first list within a first area of the user interface, and the attributes not previously configured for the first item are displayed in a second list within a second area of the user interface adjacent the first area.

8. A method according to claim 6 wherein each of the plurality of user selectable attributes have values configurable by a user.

9. A method of configuring attributes for a first item contained within a set, the method comprising the steps of:

displaying attributes previously configured for the first item in a first list within a user interface displayed on a display device so as to indicate their status as previously configured for the first item;

displaying attributes previously configured for other items contained within the set in a second list within the user interface displayed on the display device so as to indicate their status as previously configured for the other items; and selecting attributes for the first item from the attributes displayed in the first and second lists within the user interface.

10. A method according to claim 9 further comprising the step of displaying attributes not previously configured for any item contained within the set in a third list within in the user interface displayed on the display device so as to indicate their status as not previously configured for any item contained within the set.

11. A method according to claim 9 wherein the attributes previously configured for the first item are displayed in a first list within a first area of the user interface, and the attributes previously configured for other items contained within the set are displayed in a second list within a second area of the user interface adjacent the first area.

12. A method according to claim 10 wherein the attributes not configured for any item contained within the set are displayed in a third list within a third area of the user interface adjacent the second area.

13. A method according to claim 10 further comprising the step of selecting attributes for the first item from the attributes displayed in the first, second and third lists in the respective first, second, and third areas.

14. A data processing system for displaying, in a user interface displayed on a display device, user selectable attributes for a first item contained within a set of items, comprising:

means for displaying attributes previously configured for the first item in a first list so as to indicate their status as previously configured for the first item; and means for displaying attributes previously configured for other items contained within the set in a second list so as to indicate their status as previously configured for the other items.

15. A data processing system according to claim 14 further comprising means for displaying attributes not configured for any item contained within the set in a third list so as to indicate their status as not configured for any item within the set.

16. A data processing system according to claim 14 wherein the attributes previously configured for the first item are displayed in a first list within a first area of the user interface, and the attributes previously configured for other items contained within the set are displayed in a second list within a second area of the user interface adjacent the first area.

17. A data processing system according to claim 15 wherein the attributes not configured for any item contained within the set are displayed in a third list within a third area of the user interface adjacent the second area.

18. A data processing system according to claim 14 wherein each of the plurality of user selectable attributes have values configurable by a user.

19. A data processing system for displaying, in a user interface on a display device, user selectable attributes for a first item within a set of items, comprising:

means for displaying attributes previously configured for the first item in a first list so as to indicate their status as previously configured for the first item; and means for displaying attributes not previously configured for the first item in a second list so as to indicate their status as not previously configured for the first item.

20. A data processing system according to claim 19 wherein the attributes previously configured for the first item are displayed in a first list within a first area of the user interface, and the attributes not previously configured for the first item are displayed in a second list within a second area of the user interface adjacent the first area.

21. A data processing system according to claim 19 wherein each of the plurality of user selectable attributes have values configurable by a user.

22. A data processing system for configuring attributes for a first item contained within a set, comprising:

means for displaying attributes previously configured for the first item in a first list within a user interface displayed on a display device so as to indicate their status as previously configured for the first item;

means for displaying attributes previously configured for other items contained within the set in a second list within the user interface displayed on the display device so as to indicate their status as previously configured for the other items; and means for selecting attributes for the first item from the attributes displayed in the first and second lists within the user interface.

23. A data processing system according to claim 22 further comprising means for displaying attributes not previously configured for any item contained within the set in a third list within the user interface displayed on the display device so as to indicate their status as not previously configured for any item contained within the set.

24. A data processing system according to claim 22 wherein the attributes previously configured for the first item are displayed in a first list within a first area of the user interface, and the attributes previously configured for other items contained within the set are displayed in a second list within a second area of the user interface adjacent the first area.

25. A data processing system according to claim 23 wherein the attributes not configured for any item contained within the set are displayed in a third list within a third area of the user interface adjacent the second area.

26. A data processing system according to claim 23 further comprising means for selecting attributes for the first item from the attributes displayed in the first, second and third lists within the respective first, second, and third areas.

27. A computer program product for displaying, in a user interface displayed on a display device, user selectable attributes for a first item contained within a set of items, comprising:

a computer usable medium having computer readable program code means embodied in said medium for displaying attributes previously configured for the first item in a first list so as to indicate their status as previously configured for the first item; and the computer usable medium having computer readable program code means embodied in said medium for displaying attributes previously configured for other items contained within the set in a second list so as to indicate their status as previously configured for the other items.

28. A computer program product according to claim 27 further comprising computer readable program code means embodied in said medium for displaying attributes not configured for any item contained within the set in a third list so as to indicate their status as not configured for any item within the set.

29. A computer program product according to claim 27 wherein the attributes previously configured for the first item are displayed in a first list within a first area of the user interface, and the attributes previously configured for other items contained within the set are displayed in a second list within a second area of the user interface adjacent the first area.

30. A computer program product according to claim 28 wherein the attributes not configured for any item contained within the set are displayed in a third list within a third area of the user interface adjacent the second area.

31. A computer program product according to claim 27 wherein each of the plurality of user selectable attributes have values configurable by a user.

32. A computer program product for displaying, in a user interface on a display device, user selectable attributes for a first item within a set of items, comprising:

a computer usable medium having computer readable program code means embodied in said medium for displaying attributes previously configured for the first item in a first list so as to indicate their status as previously configured for the first item; and the computer usable medium having computer readable program code means embodied in said medium for displaying attributes not previously configured for the first item in a second list so as to indicate their status as not previously configured for the first item.

33. A computer program product according to claim 32 wherein the attributes previously configured for the first item are displayed in a first list within a first area of the user interface, and the attributes not previously configured for the first item are displayed in a second list within a second area of the user interface adjacent the first area.

34. A computer program product according to claim 32 wherein each of the plurality of user selectable attributes have values configurable by a user.

35. A computer program product for configuring attributes for a first item contained within a set, comprising:

a computer usable medium having computer readable program code means embodied in said medium for displaying attributes previously configured for the first item in a first list within a user interface displayed on a display device so as to indicate their status as previously configured for the first item;

the computer usable medium having computer readable program code means embodied in said medium for displaying attributes previously configured for other items contained within the set in a second list within the user interface displayed on the display device so as to indicate their status as previously configured for the other items; and the computer usable medium having computer readable program code means embodied in said medium for selecting attributes for the first item from the attributes displayed in the first and second lists within the user interface.

36. A computer program product according to claim 35 further comprising computer readable program code means embodied in said medium for displaying attributes not previously configured for any item contained within the set in a third list within the user interface displayed on the display device so as to indicate their status as not previously configured for any item contained within the set.

37. A computer program product according to claim 35 wherein the attributes previously configured for the first item are displayed in a first list within a first area of the user interface, and the attributes previously configured for other items contained within the set are displayed in a second list within a second area of the user interface adjacent the first area.

38. A computer program product according to claim 36 wherein the attributes not configured for any item contained within the set are displayed in a third list within a third area of the user interface adjacent the second area.

39. A computer program product according to claim 36 further comprising computer readable program code means embodied in said medium for selecting attributes for the first item from the attributes displayed in the first, second and third lists within the respective first, second, and third areas.

* * * * *